(12) United States Patent
Elfring et al.

(10) Patent No.: US 6,815,010 B2
(45) Date of Patent: Nov. 9, 2004

(54) METHOD OF INHIBITING THE LOSS OF SOLAR REFLECTANCE OVER TIME OF AN EXTERIOR ELASTOMERIC

(75) Inventors: William Henry Elfring, Philadelphia, PA (US); Donald Alfred Winey, Warminster, PA (US)

(73) Assignee: Rohm and Naas Company, Philadelphia, PA (US)

( * ) Notice: Subject to any disclaimer, the term of this patent is extended or adjusted under 35 U.S.C. 154(b) by 68 days.

(21) Appl. No.: 09/846,131

(22) Filed: May 1, 2001

(65) Prior Publication Data

US 2002/0103283 A1 Aug. 1, 2002

Related U.S. Application Data

(60) Provisional application No. 60/208,131, filed on May 31, 2000.

(51) Int. Cl.[7] .................................................. B05D 3/00
(52) U.S. Cl. .................. 427/385.5; 427/331; 427/372.2; 427/393.5; 427/393.6; 523/135
(58) Field of Search .......................... 523/135; 427/331, 427/393.6, 372.2, 385.5, 393.5; 524/425, 430, 446, 448, 451, 449, 493, 497, 555, 556, 521, 522

(56) References Cited

U.S. PATENT DOCUMENTS

| | | | |
|---|---|---|---|
| 2,877,142 A | | 3/1959 | Rusher et al. |
| 3,248,356 A | * | 4/1966 | Snyder ....................... 523/221 |
| 3,356,627 A | | 12/1967 | Scott |
| 3,792,000 A | * | 2/1974 | Conger et al. ............ 106/18.35 |
| 4,199,370 A | * | 4/1980 | Brand ......................... 106/446 |
| 4,277,385 A | | 7/1981 | Carroll et al. |
| 4,283,320 A | | 8/1981 | Carroll et al. |
| 4,427,836 A | | 1/1984 | Kowalski et al. |
| 4,571,415 A | | 2/1986 | Jordan, Jr. |
| 4,745,032 A | * | 5/1988 | Morrison ................ 106/287.35 |
| 4,774,291 A | | 9/1988 | Maeda |
| 4,783,498 A | | 11/1988 | Padget et al. |
| 4,897,291 A | * | 1/1990 | Kim ........................... 427/393 |
| 4,972,000 A | | 11/1990 | Kawashima et al. |
| 4,983,426 A | * | 1/1991 | Jordan, Jr. ............... 427/407.1 |
| 5,026,782 A | | 6/1991 | Biale |
| 5,059,456 A | * | 10/1991 | Larson et al. ............. 427/407.1 |
| 5,157,084 A | | 10/1992 | Lee et al. |
| 5,219,914 A | | 6/1993 | Warburton, Jr. |
| 5,219,916 A | | 6/1993 | Den Hartog et al. |
| 5,274,016 A | | 12/1993 | Berner et al. |
| 5,344,675 A | * | 9/1994 | Snyder ..................... 427/388.4 |
| 5,356,968 A | | 10/1994 | Rupaner et al. |
| 5,403,393 A | * | 4/1995 | Dubble ....................... 106/277 |
| 5,418,013 A | * | 5/1995 | Detrick et al. .............. 427/340 |
| 5,476,882 A | | 12/1995 | Berner et al. |
| 5,494,716 A | * | 2/1996 | Seung et al. ................ 428/34.2 |
| 5,521,253 A | | 5/1996 | Lee et al. |
| 5,541,239 A | | 7/1996 | Heywood, Jr. |
| 5,599,586 A | * | 2/1997 | Israel .......................... 427/299 |
| 5,646,201 A | | 7/1997 | Araki et al. |
| 5,663,213 A | | 9/1997 | Jones et al. |
| 5,688,853 A | | 11/1997 | Salter et al. |
| 5,731,377 A | | 3/1998 | Friel |
| 5,741,844 A | * | 4/1998 | Nass et al. ..................... 524/13 |
| 5,990,228 A | | 11/1999 | Eichman et al. |
| 6,020,416 A | | 2/2000 | Mazur et al. |
| 6,060,555 A | * | 5/2000 | Wright ........................ 427/340 |
| 6,063,856 A | * | 5/2000 | Mass ........................... 524/13 |
| 6,255,381 B1 | * | 7/2001 | Parks et al. ................. 524/522 |

FOREIGN PATENT DOCUMENTS

| | | |
|---|---|---|
| EP | 0 010 000 | 6/1983 |
| EP | 0 750 023 | 12/1996 |
| EP | 0 761 778 | 3/1997 |
| EP | 0764 741 A2 * | 3/1997 |
| EP | 0 778 296 | 6/1997 |
| EP | 0 505 650 B1 | 9/2002 |

OTHER PUBLICATIONS

"RHOPLEX® B–85 Acrylic Polymer Emulsion", Polymers, Resins and Monomers—Building Products, Rohm and Haas Company, Philadelphia, PA 19105 (Nov. 1983).
"Extending a roof's life", Building, Design & Construction, Jun., 1987.
"EC Technology for roof mastics", Rohm and Haas Company, Philadelphia , PA (Oct., 1988).
"RHOPLEX® EC–1791 100% Acrylic" EC Technology For Elastomeric Roof Coatings, Rohm and Haas Company, Philadelphia, PA 19105 (Dec., 1989).
"RHOPLEX® EC Technology" Rohm and Haas Compnay, Philadelphia, PA 19105.
"Confirming The Exterior Durability Of Ropaque® OP–62 Opaque Polymer", Resin Review, vol. XXXIX, No. 2, 1989.
"Prolong the life of a roof.", Rohm and Haas Company, Philadelphia, PA , Jul., 1990.
"Ropaque® OP–96 Opacifier: Heightening The Appeal Of Opaque Polymer", Brush Strokes, vol. IV, 1996.
"Ropaque® Opaque Polymer Improved Dirt Pickup Resistance", Brush Strokes, vol. V, 1997.

* cited by examiner

Primary Examiner—Judy M. Reddick

(57) ABSTRACT

A method of inhibiting the loss of solar reflectivity over time of an exterior elastomeric coating composition comprising an organic binder and at least one inorganic additive comprises: replacing at least a part of the at least one inorganic additive with a solid, particulate, organic polymer having a Tg greater than 70° C. An improved exterior elastomeric coating composition is also disclosed.

3 Claims, No Drawings

METHOD OF INHIBITING THE LOSS OF SOLAR REFLECTANCE OVER TIME OF AN EXTERIOR ELASTOMERIC

CROSS REFERENCE TO RELATED PATENT APPLICATIONS

This non-provisional application claims benefit of provisional Application 60/208,131 filed May 31, 2000.

The present invention relates to improved elastomeric, exterior coating compositions, more specifically, elastomeric, exterior coating compositions having improved long term solar reflectance.

There is a growing awareness and concern over the "urban heat island" effect that is being created in cities. One of the major contributors to this effect is black roofs which strongly absorb solar energy from the sun. By putting a white coating on a roof, it is possible to significantly reduce the temperature of the roof and to greatly reduce the cooling requirements of the building. Obviously, the better the solar reflectivity and the longer the reflective life of the roof, the greater the benefit to the owner of the building and the community.

Many roofs are made of asphalt-based or rubber-based materials and these materials degrade with time (i.e. chalk, embrittle, etc.). By decreasing the amount of solar energy that is absorbed and the temperature of the roof, it is possible to slow the degradation rate and thereby extend the life of the roof.

By using a highly reflective roof coating, it is possible for architects and contractors to reduce the amount of insulation required under the roof of the building. This could represent a substantial cost savings and has already been incorporated into the Georgia Building Code. However, the solar reflectivity of conventional roof coating compositions degrades over time and the benefits of an initially high solar reflectivity are diminished.

U.S. Pat. No. 5,688,853 discloses water-borne soil-resistant coatings. In particular, there is provided an aqueous coating composition comprising a blend of a low Tg aqueous polymeric dispersion and a high Tg aqueous polymeric dispersion characterized in that: the PVC of the coating composition as measured by opacity is less than the critical PVC, the polymeric dispersion with a low Tg has a Tg of less than 0° C., the polymeric dispersion with a high Tg is not film forming and has a Tg of at least 35° C. and the volume ratio of low Tg polymer dispersion to high Tg polymer dispersion is from 0.4:1 to 1.4:1. As noted at col. 6, lines 50–64: "The relative proportion of the low and high Tg dispersions is most important to the working of the present invention and we require that the volume ratio of low Tg polymeric dispersion to high Tg polymeric dispersion to be from 0.4:1 to 1.4:1. This is of course calculated on a non-volatile basis. In practice there is usually little difference between the weight and volume ratios. If the particles are based on the same monomers it is convenient to use the weight ratios as the densities of the particles are essentially the same. At ratios above the 1.4:1 upper limit the soil resistance of paint films becomes unacceptably poor. As is demonstrated in later comparative examples soil resistance at a ratio of 1.5:1 is very poor. At ratios below 0.4:1 film properties such as ability to coalesce satisfactorily at low temperatures is adversely affected."

U.S. Pat. No. 5,731,377 discloses a polymer blend of at least two emulsion polymers useful as a binder in an aqueous coating composition containing no coalescent, where the polymer blend comprises from about 20 to about 60 weight percent of a hard emulsion polymer, having a glass transition temperature (Tg) greater than about room temperature, and from about 80 to about 40 weight percent of a soft emulsion polymer, having a glass transition temperature (Tg) less than about 15° C. The polymer blend is particularly useful in preparing an aqueous coating composition which can be applied at low temperatures while providing good block resistance, as for example in the preparation of interior semi-gloss paints. As noted at col.4, line 66, to col. 5, line 14: "The soft polymer must have a Tg such that the polymer will form a film when applied to a substrate. The soft polymer should have a Tg as low as about minus 20 degrees Centigrade to about room temperature, about plus 20 degrees Centigrade. Preferably the soft polymer should have Tg in the range of from about minus 5 degrees Centigrade to about plus 10 degrees Centigrade, and most preferably from about 0 degrees Centigrade to about plus 5 degrees Centigrade. The hard polymer is required to be present in the blend to provide the film with the desired physical properties, such as for example hardness and block resistance. The Tg of the hard polymer should be greater than room temperature, preferably greater than about 25 degrees Centigrade, and most preferably in the range of from about 25 to about 65 degrees Centigrade."

U.S. Pat. No. 5,990,228 discloses aqueous coating compositions containing at least two polymer components which provide adhesion and improved durability as measured by improved gloss retention or dirt pick up resistance in dried coatings made from the coating compositions. In particular, the aqueous coating compositions comprise an emulsion polymer prepared from at least one ethylenically unsaturated monomer, provided that the monomer is not an alkene or a diene, the emulsion polymer having: from 40% to 90% by weight of a first polymer having a Tg of from 0° C. to 60° C.; and from 10% to 60% by weight of a second polymer having a Tg of from 10° C. to 100° C., provided that the Tg of the second polymer is at least 10° C. higher than the Tg of the first polymer, and provided that the first polymer is higher in molecular weight than the second polymer, such that when both polymers are combined, from 5% to 40% by weight of the total polymer has a molecular weight greater than 225,000 and greater than 30% by weight of the total polymer has a molecular weight below 52,000.

U.S. Pat. No. 6,020,416 discloses aqueous blends of colloidally dispersed polymers for use in making organic coatings which are hard and ductile at ambient temperature, and which remain stiff and elastic at temperatures well above their film-formation or drying temperature. In particular, there are disclosed blends of high-molecular-weight, thermoplastic polymers which are capable of developing these mechanical properties without conventional amounts of volatile organic coalescing aids and without the need for chemical cure. More particularly, there is disclosed an aqueous dispersion comprising a blend of polymer components each in the form of colloidal particles having average hydrodynamic diameters less than about 1000 nm and preferably less than about 200 nm, the polymer components comprising: a first polymer component comprising about 20% to about 50% by volume of the total polymeric content and exhibiting a measured Tg of greater than or equal to 49° C.; a second polymer component comprising about 20% to about 50% by volume of the total polymeric content and exhibiting a measured Tg less than 49° C. and greater than 24° C.; and a third polymer component comprising 0% to about 35% by volume of the total polymeric content and exhibiting a measured Tg less than 24° C.; the sum of all three polymers being 100% by volume; wherein the first, second and third polymer components each have a molecular weight greater than about 80,000 Daltons and are mutually adherent; and wherein the aqueous dispersion has a volatile organic content of less than about 20% by weight of the total polymeric content.

European Published Patent Application No. 0 761 778 A1 discloses a method for providing gloss control in a dried film from an aqueous coating. A specified level of gloss is affected by the addition of hard latex polymer particles to soft film-forming polymer latex particles. By adjusting the hard particle parameters of amount and relative particle size, the desired film gloss can be achieved. Moreover, there is disclosed an aqueous coating composition comprising hard polymer particles and soft polymer particles, where the hard and soft polymer particles are in the range of from 30 nm to 1,000 nm in size; wherein the hard particles are present in an amount of from 1% to 60% by weight of polymer solids, are non-film-forming and have a Tg of from 35° C. to 160° C.; and wherein the soft particles are present in an amount of from 40% to 99% by weight of polymer solids, are film-forming and have a Tg in the range of from −30° C. to +75° C., provided that the Tg of the hard particles is greater than the Tg of the soft particles.

U.S. Pat. No. 4,774,291 discloses a polymer composition obtained by mixing, in an emulsion state: (A) from 20 to 90% by weight (as solid content of polymer) of an emulsion of polymer component A which is a polymer of a vinyl monomer and has a glass transition temperature of higher than 20° C., a gel content of not higher than 10% and a solubility parameter of from 8.0 to 11.0 $(cal/cc)^{1/2}$ and which has a weight average molecular weight, based on polystyrene, of at least $1.5 \times 10^5$; and (B) from 10 to 80% by weight (as solid content of polymer) of an emulsion of polymer component B which is a homopolymer of an acrylate monomer, a copolymer of acrylate monomers or a copolymer of an acrylate monomer with other copolymerizable monomer and has a glass transition temperature of not higher than 20° C., a gel content of not higher than 70% and a solubility parameter of from 8.4 to 9.8 $(cal/cc)^{1/2}$; and then separating the polymer from the emulsion mixture.

European Published Patent Application No. 0 778 296 A1 discloses soil-resistant polymers and methods for their manufacture. These polymers are aqueous emulsion polymers suitable for use in exterior coatings, such as elastomeric wall coatings, caulks and roof coatings. These polymers exhibit improved dirt pick-up resistance during exterior exposure while maintaining proper adhesion and resistance to cracking. In particular, there is disclosed an aqueous emulsion polymer comprising, as polymerized units, (a) from 50 to 99.8 percent by weight of at least one alkyl(meth)acrylate, (b) from 0.2 to 20 percent by weight of an alkylstyrene, wherein the alkyl group is substituted on the ring, (c) from 0 to 10 percent by weight of at least one α,β-ethylenically unsaturated monobasic or dibasic carboxylic acid or anhydride thereof, and (d) from 0 to 49.8 percent by weight of at least one α,β-ethylenically unsaturated monomer different from (a), (b) and (c); wherein the Tg of the emulsion polymer is less than 0° C.

U.S. Pat. No. 4,283,320 discloses an aqueous latex dispersion paint composition which coalesces at an ambient coalescing temperature into a semi-gloss hardened continuous paint film, the latex paint having about 30% to 70% by weight total solids and comprising on a dry solids volume basis: 55% to 70% of a film-forming latex binder having a major weight portion of polymer particles between about 500 Å and 5000 Å and having a glass transition temperature at least about 5° C. below the coalescing temperature whereby the binder particles will coalesce into a binding matrix, the binding particles being a vinyl copolymer comprising by weight at least 40% polymerized vinyl unsaturated monomers; 10% to 25% of solid, non-cellular, non-film-forming polymer particles having a weighted average diameter between about 1000 Å and 5000 Å and having a glass transition temperature at least about 30° C. above the glass transition temperature of the binder, the non-film-forming polymer particles being polymerized ethylenically unsaturated monomers containing between 0.2% and 2% of copolymerized acid monomer selected from acrylic acid or methacrylic acid; 5% to 20% opacifying pigment having a refractive index of at least about 1.8; 0% to 15% of non-opacifying pigment; and the latex paint has a pigment volume content (PVC) between about 30% and 45% PVC but less than critical PVC as measured by opacity.

U.S. Pat. No. 5,541,239 discloses a liquid varnish for forming a substantially clear film consisting essentially of a clear varnish forming liquid polymer system and suspended therein particles of non-cross-linked clear polymer having an average diameter of less than 200 $\mu$m that contain dissolved ultraviolet absorber.

Gozdan, et al., "Confirming The Exterior Durability Of Ropaque® OP-62 Opaque Polymer", Resin Review (A Rohm And Haas Company Publication) Vol. XXXIX, No. 2, pp. 15–24 (1989) discloses that exposure testing has revealed that latex exterior paints formulated with added Ropaque® OP-62 opaque polymer possess virtually the same durability as counterparts formulated with conventional pigments.

Percival, et al., "Ropaque® Opaque Polymer Improved Dirt Pickup Resistance", Brush Strokes (A Rohm And Haas Company Publication) Vol. V., No. 1, pp.17–22 (1997) discloses that the use of a Ropaque® opaque polymer hiding additive can promote dirt pickup resistance in exterior latex paints. In particular, studies indicate that in paints containing a sufficient added concentration of opaque polymer, the surface of the paint film contains enough additive particles to block airborne dirt from the comparatively soft, tacky binder resin.

"EC Technology For Elastomeric Roof Coatings— Rhoplex® EC-1791 100% Acrylic" (Rohm and Haas Company, December, 1989) discloses that polymers designed for elastomeric roof coatings combine the inherent flexibility of pliable low Tg polymers with long-term resistance to dirt pickup. Without dirt pickup resistance, the roof coating would quickly darken with age. Because dark materials tend to absorb heat, dirt pickup can significantly increase roof surface temperatures, which in turn increases interior temperatures and energy costs. Rhoplex® EC-based coatings, however, are taught to resist dirt pickup and retain their white, reflective appearance.

Nonetheless, the problem addressed by the present invention is the inevitable loss, over time, of the solar reflectivity of exterior elastomeric coating compositions, especially elastomeric roof coating compositions. It has now been found that the loss of solar reflectivity, over time, can be inhibited by the replacement of at least a portion of the inorganic additives normally found in exterior elastomeric coating compositions with organic particulate polymers having a Tg greater than 70° C.

In a first aspect of the present invention, there is provided an improved exterior elastomeric coating composition comprising an organic binder, having a Tg less than −20° C., and at least one inorganic additive wherein the improvement comprises replacing at least a part of the at least one inorganic additive with a solid, particulate organic polymer having a Tg greater than 70° C.

In a second aspect of the present invention, there is provided a method of inhibiting the loss of solar reflectivity over time of an exterior elastomeric coating composition comprising an organic binder, having a Tg less than −20° C., and at least one inorganic additive, the method comprising replacing at least a part of the at least one inorganic additive with a solid, particulate organic polymer having a Tg greater than 70° C. Typically, the loss of solar reflectivity is inhibited for extended periods of time, e.g., 3–10 years or longer.

The aqueous dispersions of water-insoluble latex polymer that may be used in the present invention are prepared by emulsion polymerization. Emulsion polymerization techniques are well known to the art, and are discussed in D. C. Blackley, Emulsion Polymerization (Wiley, 1975). Any monomer mixture which yields water-insoluble polymer latex which is dispersible in water may be used to prepare latex polymers for the present compositions. For example, vinyl acetate, which itself has appreciable water-solubility as a monomer, may be employed, as homopolymers of vinyl acetate are water-insoluble. Acrylic monomers such as the alkyl esters of acrylic acid and methacrylic acid are preferred. Examples of acrylic monomers which may be used to prepare the latex polymers of the present invention include the $C_{1-18}$ alkyl esters of acrylic acid and the $C_{1-18}$ alkyl esters of methacrylic acid, such as methyl methacrylate, methyl acrylate, ethyl acrylate, ethyl methacrylate, n-butyl methacrylate, n-butyl acrylate, 2-ethylhexyl acrylate, n-octyl acrylate, sec-butyl acrylate, isobutyl acrylate and cyclopropyl acrylate.

Minor amounts of α,β-ethylenically unsaturated monomers with appreciable water-solubility, such as acrylic acid, methacrylic acid, itaconic acid, citraconic acid, sodium styrene sulfonate, acrylamide and methacrylamide, may also be used in preparing the emulsion polymers used in the compositions of the present invention. As is well known in the art, the copolymerization of such water-soluble monomers with water-insoluble monomers often confers desirable properties upon the resulting copolymer, such as long-term latex stability, dispersibility, increased adhesion to specific substrates, and the like.

Acidic monomers which may be used in preparing emulsions employed in the present invention are α,β-monoethylenically unsaturated acids such as maleic, fumaric, aconitic, crotonic, citraconic, acryloxypropionic and higher oligomers of acrylic, methacrylic and itaconic acids. Further examples of acidic monoethylenically unsaturated monomers that may be copolymerized to form the water-insoluble addition polymers of the instant invention are partial esters of unsaturated aliphatic dicarboxylic acids and particularly, the alkyl half esters of such acids. Examples of such partial esters are alkyl half esters of itaconic acid, fumaric acid and maleic acid wherein the alkyl group contains 1 to 6 carbon atoms. Representative members of this group of compounds include methyl acid itaconate, butyl acid itaconate, ethyl acid fumarate, butyl acid fumarate and methyl acid maleate.

Emulsion polymers employable in the present invention may contain α,β-ethylenically unsaturated aromatic monomer, such as styrene, vinyl toluene, 2-bromo-styrene, o-bromo-styrene, p-chloro-styrene, 0-methoxy-styrene, p-methoxy-styrene, allylphenyl ether, allyltolyl ether and α-methylstyrene.

Emulsion polymers employable in the present invention may contain polar or polarizable non-ionogenic hydrophilic monomer, including nitriles such as acrylonitrile, methacrylonitrile, cis- and trans-crotonitrile, α-cyanostyrene, and α-chloroacrylonitrile; vinyl ethers such as ethyl vinyl ether, isopropyl vinyl ether, isobutyl vinyl ether, butyl vinyl ether, diethylene glycol vinyl ether and decyl vinyl ether; hydroxyalkyl (meth)acrylates such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate and 2-hydroxypropyl methacrylate; and vinyl thiols such as 2-mercaptopropyl methacrylate, 2-sulfoethyl methacrylate, methyl vinyl sulfide and propyl vinyl sulfide.

Emulsion polymers employable in the present invention may contain monomeric vinyl ester in which the acid moiety of the ester is selected from aromatic and $C_{1-18}$ aliphatic acids. Examples of such acids include formic, acetic, propionic, n-butyric, n-valeric, palmitic, stearic, phenyl acetic, benzoic, chloroacetic, dichloroacetic, γ-chlorobutyric, 4-chlorobenzoic, 2,5-dimethylbenzoic, o-toluic, 2,4,5-trimethoxybenzoic, cyclobutanecarboxylic, cyclohexanecarboxylic, 1-(p-methoxyphenyl)cyclohexanecarboxylic, 1-(p-tolyl)cyclopentanecarboxylic, hexanoic, myristic and p-toluic acids.

The monomer mix may also include multifunctional monomers such as allyl methacrylate, divinyl benzene, diethylene glycol dimethacrylate, ethylene glycol dimethacrylate, 1,6-hexanediol diacrylate, 1,3-butylene glycol dimethacrylate, trimethylol propane triacrylate, trimethylol propane trimethacrylate, diallyl phthalate, and the like.

Conventional emulsion polymerization techniques may be used to prepare polymers employed in the compositions of this invention. Thus, the monomers may be emulsified with an anionic or nonionic dispersing agent, about 0.1% to 10% thereof may be utilized based on the total weight of the monomers. Acidic monomers are water-soluble and thus serve as dispersing agents which aid in emulsifying the other monomers used. A polymerization initiator of the free radical type, such as ammonium, sodium or potassium persulfate, may be used alone or in conjunction with an accelerator, such as potassium metabisulfite or sodium thiosulfate. The initiator and accelerator, commonly referred to as catalysts, may be used in proportions of 0.02% to 2% each based on the total weight of the monomers to be polymerized. Thermal and redox processes may be utilized. The polymerization temperature may be from room temperature to 90° C., or more, as is conventional. Batch, gradual addition, continuous and multiple stage processes may be used.

Examples of emulsifiers which are suited to the polymerization process of emulsions used in the present invention include alkali metal and ammonium salts of alkyl-, aryl-, alkaryl- and aralkyl-sulfonates, sulfates and polyether sulfates; the corresponding phosphates and phosphonates; alkoxylated fatty acids, esters, alcohols, amines and amides; and alkylphenols. Polymerizable surfactants, such as, for example, sodium alkyl sulfosuccinate or disodium sulfosuccinate, may also be utilized.

Chain transfer agents, including mercaptans, polymercaptans and polyhalogen compounds, are often desirable in the polymerization mixture to control polymer molecular weight.

As used in the present specification and claims, the phrase "glass transition temperature" or "Tg" means the temperature at or above which a glassy polymer will undergo segmental motion of the polymer chain, and it is a conventional criterion of polymer hardness (Flory, "Principles of Polymer Chemistry", pp. 56 and 57, Cornell University Press (1953); "Polymer Handbook", Brandrup and Immergut, Sec. III, pp. 61–63, Interscience (1966)). Tg, as used herein, may be calculated from the Fox equation (Bull. Am. Phys. Soc. 1, 3, pg. 123 (1956)) as follows:

$$(1/Tg)=(w(1)/Tg(1))+(w(2)/Tg(2))$$

For a copolymer, w(1) and w(2) refer to the weight fraction of the two comonomers, respectively, and Tg(1) and Tg(2) refer to the glass transition temperatures, in degrees Kelvin (° K.), of the two corresponding homopolymers. (Note: Tg(° C.)=Tg(° K.)−273.15) For polymers containing three or more monomers, additional terms are added, w(n)/Tg(n). Examples of homopolymers and the inherent Tg thereof which permits such calculations are as follows:

| Homopolymer of | Tg |
| --- | --- |
| n-octyl acrylate | −80° C. |
| n-decyl methacrylate | −60° C. |
| 2-ethylhexyl acrylate | −70° C. |
| n-butyl acrylate | −56° C. |
| octyl methacrylate | −20° C. |
| n-tetradecyl methacrylate | −9° C. |
| methyl acrylate | 9° C. |
| n-tetradecyl acrylate | 20° C. |
| t-butyl acrylate | 43° C. |
| methyl methacrylate | 105° C. |
| acrylic acid | 106° C. |
| styrene | 100° C. |
| methacrylic acid | 185° C. |

These or other monomers are blended to give the desired Tg of the copolymer.

The organic binder of the present invention is characterized by a Tg of less than −20° C., preferably less than −30° C., most preferably less than −30° C., for example, −40° C.

The particle size of the organic binder is not deemed to be critical, but would typically be in the range of 50 to 1300 nm, for example, in the range of 100 to 1000 nm.

Preferably, the organic binder polymer comprises a major proportion (more than 50%) of units of at least one ester of acrylic acid with an alkanol containing from 1 to 4 carbon atoms and a minor proportion (less than 50%) of units of one or more of at least one ester of methacrylic acid with an alkanol containing from 1 to 4 carbon atoms, acrylonitrile, methacrylonitrile, acrylic acid and methacrylic acid.

Suitable organic binders are available commercially from a number of vendors. Preferred is RHOPLEX® EC-1791 (Rohm and Haas Company, Philadelphia, Pa.).

The solid particulate organic polymer of the present invention, on the other hand is characterized by a Tg greater than 70° C., preferably greater than 80° C., more preferably greater than 90° C., most preferably greater than 100° C., for example, 120° C. The solid particulate organic polymer of the present invention may be produced by the same techniques, as disclosed above, for the organic binder, so long as a suitable selection of monomer(s) is made to achieve the desired Tg. As preferred monomers, mention may be made of methyl methacrylate, acrylonitrile and styrene. Additionally, the solid particulate organic polymer may also be produced by comminuting an organic polymer having a suitable Tg by methods conventional in the art.

The particle size of the solid particulate organic polymer of the present invention is also not deemed to be critical, but would typically be in the range of 50 to 1300 nm, for example, in the range of 100 to 1000 nm.

As used in the present specification and claims, the phrase "inorganic additive(s)" denotes inorganic materials which are used to impart aesthetic and functional qualities, e.g., pigments such as rutile and anatase titanium dioxide, and inorganic materials which are used to fill the compositions, e.g., fillers such as calcium carbonate.

The inorganic additives are conventionally present in an amount of from 10% to 90% by weight of the total solids in the composition depending upon the consistency desired, the presence or absence of thickening agents, the amount and identity of solvent utilized, and so forth. Suitable inorganic additives include, for example, rutile and anatase titanium dioxide, calcite, limestone, mica, talc, asbestos fiber or powder, diatomaceous earth, barytes, alumina, slate flour, calcium silicate, clay, colloidal silica, magnesium carbonate, magnesium silicate, zinc oxide and so on.

The inorganic additives used in the compositions of this invention can de dispersed using high speed dispersion equipment such as a Cowles disperser. An anionic dispersant, such as polyacrylate or polyphosphate, may be used as a dispersing aid and for stabilizing the dispersion. Copolymers of acrylic acid and/or methacrylic acid with lower alkyl acrylates are preferred as dispersants. Potassium tripolyphosphate or other types of "condensed" phosphates, that is, dehydrated polymerized orthophosphate in which the $H_2O$ to $P_2O_5$ ratio is less than 3 to 1, may be used. Sulfonated polymers, including naphthalene-formaldehyde sulfonated polycondensates, polymaleates, natural product-derived dispersants, such as tannins, lignins, alginates, gluconates, glucosides, and organic phosphonates including methylene phosphonates, may be used. The particular type and amount of dispersant employed may depend on the inorganic additive types and grades selected, and particular grades of certain pigments, for example, titanium dioxide, are available commercially in pre-dispersed form. The amount of the dispersant used depends on the surface area of the inorganic additive employed per unit volume of the composition. The amount is easily determinable by those skilled in the coatings art by conventional techniques.

The compositions of the present invention may be thickened using conventional coating thickeners as desired. For example, cellulosic thickeners such as methyl cellulose and hydroxyethyl cellulose may be used. Other types of thickeners and rheology modifiers, such as associative hydrophobic alkali soluble emulsions may be used. The amount of the thickener employed depends on the type of coatings product to be prepared, the pigment/binder ratio of the composition, the type and grade of thickener used, the application technique to be used, etc.

The compositions of the present invention may also include conventional coatings ingredients such as can preservatives, antimicrobial agents, mildewcides, antifreeze agents, coalescents, defoaming agents, colorants, dyes, cosolvents, plasticizers, UV stabilizers and adhesion promoters.

In accord with the present invention, a solid particulate organic polymer having a Tg greater than 70° C. replaces at least a portion of the inorganic additives normally found in an exterior elastomeric coating composition. Preferably, the PVC value of the exterior elastomeric coating composition is maintained at a constant value. Since the solid particulate organic polymer is considered part of the non-film-forming "pigment/extender" portion of the coating volume, keeping the PVC constant in this fashion will mean that, for the most part, the flexibility and other binder dependent properties of the coating will be unchanged.

(Pigment volume concentration (PVC) is defined as follows:

$$PVC=((Vp+Ve)/(Vp+Ve+Vb))\times 100$$

where
Vp=volume of pigment
Vb=volume of binder
Ve=volume of extender

Essentially, PVC is the ratio of pigment and extender volume to the total solids volume of the coating formulation.)

In a preferred embodiment, the solid particulate organic polymer having a Tg greater than 70° C. is used to replace inorganic additives in an exterior elastomeric coating composition so as to be present in an amount such that the volume ratio of the organic binder to the solid particulate organic polymer having a Tg greater than 70° C. is in the range of 1.6:1 to 95:1, preferably 1.6:1 to 25:1, more preferably 1.6:1 to 9:1, most preferably 1.6:1 to 4:1.

EXAMPLES

Aqueous acrylic polymer latices 1 and 2 were prepared by conventional emulsion polymerization techniques. The physical properties of the latices are set forth in Table 1.

TABLE 1

| Property | Latex 1 | Latex 2 |
| --- | --- | --- |
| Solids (% by weight) | 56.4 | 35.7 |
| Particle Size (nm) | 350 | 350 |
| Polymer Composition (parts by weight) | | |
| Butyl Acrylate | 85 | — |
| Methyl Methacrylate | 12.35 | 98 |
| Methacrylic Acid | 1.65 | 2 |
| Glass Transition Temp. (Tg) | −40° C. | 106° C. |

Latex blends 1 and 2 were formed from latices 1 and 2 as set forth in Table 2.

TABLE 2

| Material | Latex Blend 1 | Latex Blend 2 |
| --- | --- | --- |
| Latex 1 (lbs.) | 428.60 | 401.90 |
| Latex 2 (lbs.) | 87.20 | 164.10 |
| Total (lbs.) | 515.80 | 566.00 |

Preparation Example 1

A conventional elastomeric roof coating formulation was prepared as set forth in Table 3.

TABLE 3

| Material | Material Type | Pounds | Gallons | Level |
| --- | --- | --- | --- | --- |
| Water | Solvent | 164.20 | 19.67 | |
| Tamol 850 (1) | Dispersant | 4.80 | 0.48 | |
| KTPP (2) | Dispersant | 1.43 | 0.09 | |
| Nopco NXZ (3) | Defoamer | 3.80 | 0.50 | |
| Duramite (4) | Extender | 422.10 | 18.71 | 36.46% PVC |
| Zinc Oxide | Pigment/Mildewstat | 46.90 | 1.01 | 1.97% PVC |
| Ti-Pure R-960 (5) | Pigment | 70.40 | 2.18 | 4.24% PVC |
| Ethylene Glycol | Solvent | 24.40 | 2.62 | |
| Natrosol 250 MR (6) | Thickener | 4.20 | 0.39 | |
| Latex 1 | | 458.80 | 53.32 | |
| Texanol (7) | Coalescent | 7.00 | 0.88 | |
| Skane M-8 (8) | Biocide | 2.10 | 0.24 | |
| Ammonia (9) | Base | 1.00 | 0.13 | |
| Total | | 1211.13 | 100.22 | 42.67% PVC |

(1) Ammonium salt of a polymeric carboxylic acid (35%) in water (Rohm and Haas Company, Philadelphia, PA)
(2) Potassium tripolyphosphate
(3) Petroleum derivatives (Diamond Shamrock Corporation, Morristown, NJ)
(4) Calcium carbonate (Thompson-Weiman & Co., Cartersville, GA)
(5) Rutile titanium dioxide (E. I. du Pont de Nemours & Co., Inc., Wilmington, DE)
(6) Hydroxyethylcellulose (Hercules, Inc., Wilmington, DE)
(7) Eastman Kodak, Rochester, NY
(8) Rohm and Haas Company, Philadelphia, PA
(9) 28% aqueous ammonia solution

Preparation Example 2

An elastomeric roof coating formulation was prepared as set forth in Table 4.

TABLE 4

| Material | Material Type | Pounds | Gallons | Level |
| --- | --- | --- | --- | --- |
| Water | Solvent | 183.40 | 18.38 | |
| Tamol 850 (1) | Dispersant | 14.50 | 0.45 | |
| KTPP (2) | Dispersant | 1.36 | 0.08 | |
| Nopco NXZ (3) | Defoamer | 3.60 | 0.48 | |
| Duramite (4) | Extender | 315.50 | 13.98 | 29.18% PVC |
| Zinc Oxide | Pigment/Mildewstat | 43.70 | 0.94 | 1.96% PVC |
| Ti-Pure R-960 (5) | Pigment | 65.70 | 2.03 | 4.24% PVC |
| Ethylene Glycol | Solvent | 22.80 | 2.45 | |
| Natrosol 250 MR (6) | Thickener | 3.90 | 0.36 | |
| Latex Blend 1 | | 515.80 | 59.89 | 7.27% PVC (a) |
| Texanol (7) | Coalescent | 6.50 | 0.82 | |
| Skane M-8 (8) | Biocide | 2.00 | 0.23 | |
| Ammonia (9) | Base | 0.90 | 0.12 | |
| Total | | 1139.66 | 100.21 | 42.65% PVC |

(1) Ammonium salt of a polymeric carboxylic acid (35%) in water (Rohm and Haas Company, Philadelphia, PA)
(2) Potassium tripolyphosphate
(3) Petroleum derivatives (Diamond Shamrock Corporation, Morristown, NJ)
(4) Calcium carbonate (Thompson-Weiman & Co., Cartersville, GA)
(5) Rutile titanium dioxide (E. I. du Pont de Nemours & Co., Inc., Wilmington, DE)
(6) Hydroxyethylcellulose (Hercules, Inc., Wilmington, DE)
(7) Eastman Kodak, Rochester, NY
(8) Rohm and Haas Company, Philadelphia, PA
(9) 28% aqueous ammonia solution
(a) Note: Solid, particulate, organic polymer with a Tg greater than 70° C. is replacing inorganic material.

Preparation Example 3

An elastomeric roof coating formulation was prepared as set forth in Table 5.

TABLE 5

| Material | Material Type | Pounds | Gallons | Level |
|---|---|---|---|---|
| Water | Solvent | 143.80 | 17.23 | |
| Tamol 850 (1) | Dispersant | 4.20 | 0.42 | |
| KTPP (2) | Dispersant | 1.26 | 0.08 | |
| Nopco NXZ (3) | Defoamer | 3.50 | 0.46 | |
| Duramite (4) | Extender | 221.60 | 9.82 | 21.86% PVC |
| Zinc Oxide | Pigment/Mildewstat | 41.00 | 0.88 | 1.97% PVC |
| Ti-Pure R-960 (5) | Pigment | 61.70 | 1.91 | 4.24% PVC |
| Ethylene Glycol | Solvent | 21.40 | 2.30 | |
| Natrosol 250 MR (6) | Thickener | 3.70 | 0.34 | |
| Latex Blend 2 | | 566.00 | 65.67 | 14.58% PVC (a) |
| Texanol (7) | Coalescent | 6.10 | 0.77 | |
| Skane M-8 (8) | Biocide | 1.80 | 0.21 | |
| Ammonia | Base | 0.90 | 0.12 | |
| Total | | 1076.96 | 100.21 | 42.65% PVC |

(1) Ammonium salt of a polymeric carboxylic acid (35%) in water (Rohm and Haas Company, Philadelphia, PA)
(2) Potassium tripolyphosphate
(3) Petroleum derivatives (Diamond Shamrock Corporation, Morristown, NJ)
(4) Calcium carbonate (Thompson-Weiman & Co., Cartersville, GA)
(5) Rutile titanium dioxide (E. I. du Pont de Nemours & Co., Inc., Wilmington, DE)
(6) Hydroxyethylcellulose (Hercules, Inc., Wilmington, DE)
(7) Eastman Kodak, Rochester, NY
(8) Rohm and Haas Company, Philadelphia, PA
(9) 28% aqueous ammonia solution
(a) Note: Solid, particulate, organic polymer with a Tg greater than 70° C. is replacing inorganic material.

The dry film coating physical properties by volume of the elastomeric roof coating formulations of Preparation Example 1 (PE1), Preparation Example 2 (PE2) and Preparation Example 3 (PE3) are set forth in Table 6.

TABLE 6

| Property | PE 1 | PE 2 | PE 3 |
|---|---|---|---|
| Volume Concentrations (%) | | | |
| Inorganic Material | | | |
| Rutile TiO$_2$ | 4.24 | 4.24 | 4.24 |
| Zinc Oxide | 1.97 | 1.96 | 1.97 |
| Calcium Carbonate | 36.46 | 29.18 | 21.86 |
| Total Inorganic | 42.67 | 35.38 | 28.07 |
| Organic Material | | | |
| Latex 1 | 57.33 | 57.35 | 57.35 |
| Latex 2 (Tg > 70° C.) | | 7.27 | 14.58 |
| Total Organic | 57.33 | 64.62 | 71.93 |
| Total PVC (%) | 42.67 | 42.65 | 42.65 |
| Total Volume Concentrations (%) | 100.00 | 100.00 | 100.00 |

Exposure Example

Teflon-coated aluminum panels were coated respectively with the elastomeric roof coating formulations of Preparation Example 1 (PE 1), Preparation Example 2 (PE 2) and Preparation Example 3 (PE 3). The film draw-downs were at approximately 40 wet mils. The so-coated panels were exposed at Spring House, Pa. and Philadelphia, Pa. in the horizontal face-up position. Reflectance measurements were made over the course of the exposures and the results are set forth in Table 7, for exposures at Spring House, Pa., and Table 8, for exposures at Philadelphia, Pa.

TABLE 7

| Time of Exposure | Reflectance (1) | | | Solar Reflectance (2) | | |
|---|---|---|---|---|---|---|
| (months) | PE 1 | PE 2 | PE 3 | PE 1 | PE 2 | PE 3 |
| 0 | 93 | 93 | 93 | 0.87 | 0.87 | 0.87 |
| 18 | 57 | 66.8 | 74.9 | 0.48 | 0.58 | 0.66 |
| 24 | 52.2 | 67.3 | 75.5 | 0.43 | 0.58 | 0.67 |
| 30 | 50.5 | 64.6 | 77.3 | 0.41 | 0.55 | 0.69 |
| 36 | 47.9 | 57.8 | 72 | 0.39 | 0.48 | 0.63 |
| 48 | 35.5 | 41.5 | 47.9 | 0.28 | 0.33 | 0.39 |
| 60 | 47.2 | 53.3 | 57.8 | 0.38 | 0.44 | 0.48 |
| 72 | 46.5 | 50.7 | 56.1 | 0.38 | 0.42 | 0.47 |
| 84 | 43.5 | 44.3 | 53 | 0.35 | 0.36 | 0.44 |
| 96 | 45 | 41.3 | 51.1 | 0.36 | 0.33 | 0.42 |
| 108 | 45.4 | 42.7 | 51.9 | 0.37 | 0.34 | 0.43 |

(1) Diffuse visible reflectance (%) was measured with a portable Gardner Colorgard II 45°/0° reflectometer.
(2) A calibration set of white to grey panels similar in type to those exposed were measured both with a Solar Spectrum Reflectometer Model SSR-ER (Devices & Services Co.) to obtain solar reflectance values (SR) and with the Gardner Colorgard II 45°/0° reflectometer to obtain diffuse visible reflectance values (V). For these types of coatings, the relationship between the visible diffuse reflectance (V) and the solar reflectance (SR) was estimated, with a high degree of confidence, to be given by the equation: $SR = 0.0116097 + 0.0065362V + 0.0000286V^2$

TABLE 8

| Time of Exposure | Reflectance (1) | | | Solar Reflectance (2) | | |
|---|---|---|---|---|---|---|
| (months) | PE 1 | PE 2 | PE 3 | PE 1 | PE 2 | PE 3 |
| 0 | 93 | 93 | 93 | 0.87 | 0.87 | 0.87 |
| 18 | 37.6 | 51 | 63.5 | 0.30 | 0.42 | 0.54 |
| 24 | 38.2 | 52.9 | 63.8 | 0.30 | 0.44 | 0.55 |
| 30 | 41.9 | 55.5 | 65.7 | 0.34 | 0.46 | 0.56 |
| 36 | 40.2 | 56 | 65.8 | 0.32 | 0.47 | 0.57 |
| 48 | 40.2 | 53.1 | 59.8 | 0.32 | 0.44 | 0.50 |
| 60 | 46.7 | 55.1 | 62.1 | 0.38 | 0.46 | 0.53 |
| 72 | 44.9 | 51.6 | 57.3 | 0.36 | 0.43 | 0.48 |

(1) Diffuse visible reflectance (%) was measured with a portable Gardner Colorgard II 45°/0° reflectometer.
(2) A calibration set of white to grey panels similar in type to those exposed were measured both with a Solar Spectrum Reflectometer Model SSR-ER (Devices & Services Co.) to obtain solar reflectance values (SR) and with the Gardner Colorgard II 45°/0° reflectometer to obtain diffuse visible reflectance values (V). For these types of coatings, the relationship between the visible diffuse reflectance (V) and the solar reflectance (SR) was estimated, with a high degree of confidence, to be given by the equation: $SR = 0.0116097 + 0.0065362V + 0.0000286V^2$

What is claimed is:

1. A method of inhibiting the loss of solar reflectance over time of an exterior elastomeric coating composition, comprising, forming said coating composition comprising an organic binder having a Tg less than −20° C., at least one inorganic additive, and a solid particulate organic polymer having a Tg greater than 70° C., wherein said solid particulate organic polymer having a Tg greater than 70° C. is present in an amount such that a volume ratio of said organic binder to said solid particulate organic polymer having a Tg greater than 70° C. is in the range of 1.6:1 to 95:1;

applying said coating composition to an exterior surface; and exposing said coating outdoors for a period of greater than 18 months.

2. The method according to claim 1, wherein said at least one inorganic additive is selected from the group consisting of pigments, extenders and mixtures thereof.

3. The method according to claim 1, wherein said volume ratio of said organic binder to said solid particulate organic polymer having a Tg greater than 70° C. is in the range of 1.6:1 to 9:1.3.

* * * * *

UNITED STATES PATENT AND TRADEMARK OFFICE
CERTIFICATE OF CORRECTION

PATENT NO. : 6,815,010 B2
DATED : November 9, 2004
INVENTOR(S) : William Henry Elfring and Donald Alfred Winey It is certified that error appears in the above-identified patent and that said Letters Patent is hereby corrected as shown below:

Title page,
Item [73], Assignees, change "Naas" to -- Haas --

Signed and Sealed this

Twenty-fourth Day of May, 2005

JON W. DUDAS
*Director of the United States Patent and Trademark Office*